A. ANDERSEN.
HARROW.
APPLICATION FILED JUNE 9, 1914.
1,145,653.
Patented July 6, 1915.
Fig. 1.
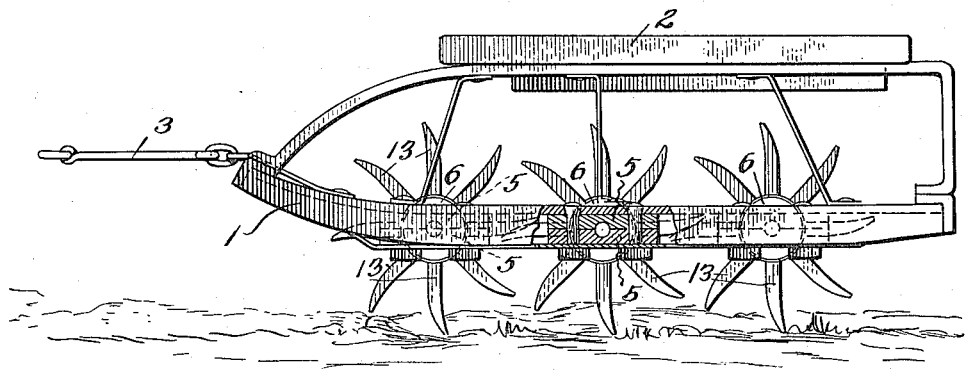
Fig. 2.
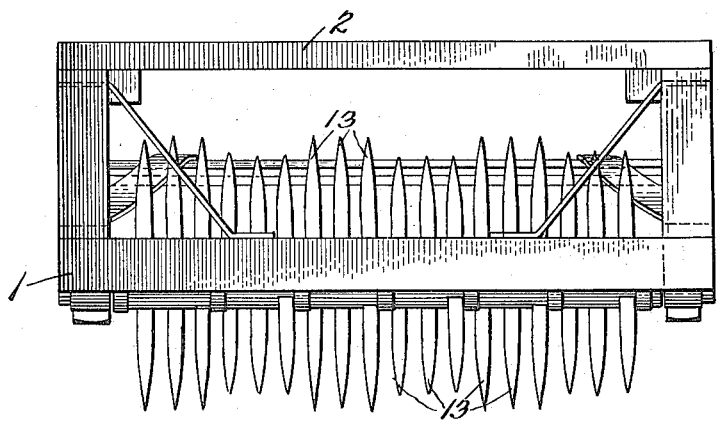
Fig. 7.
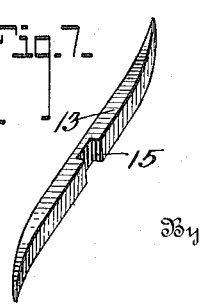
Inventor
Alfred Andersen
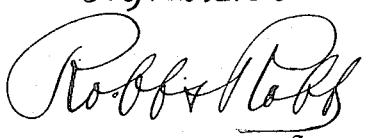
Attorneys
Witnesses

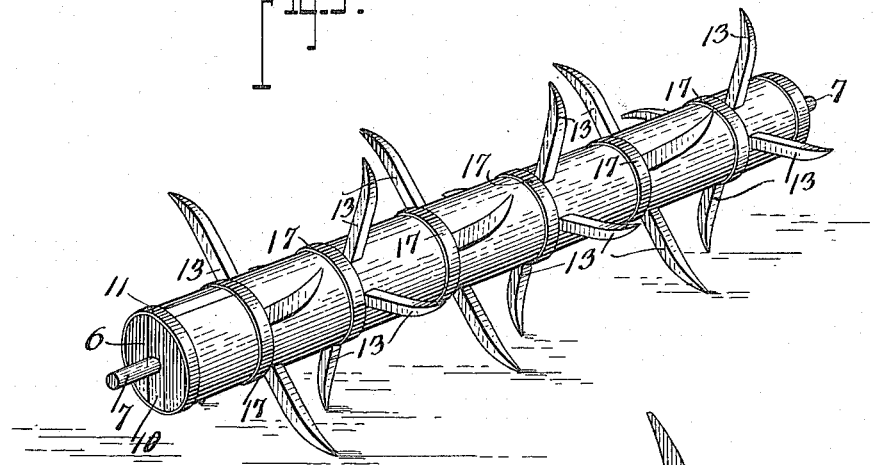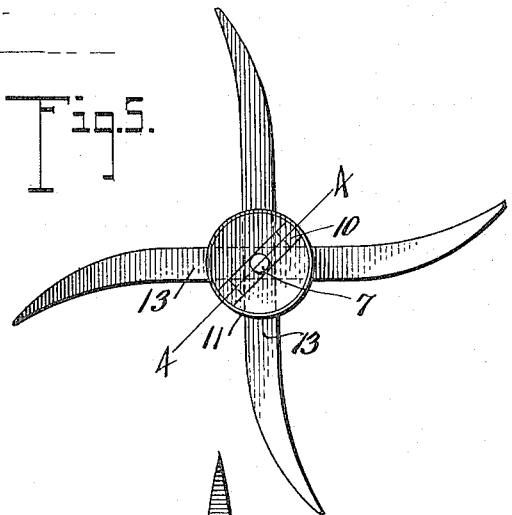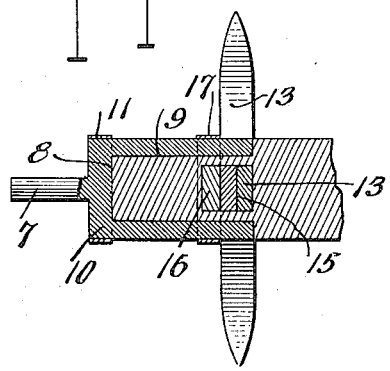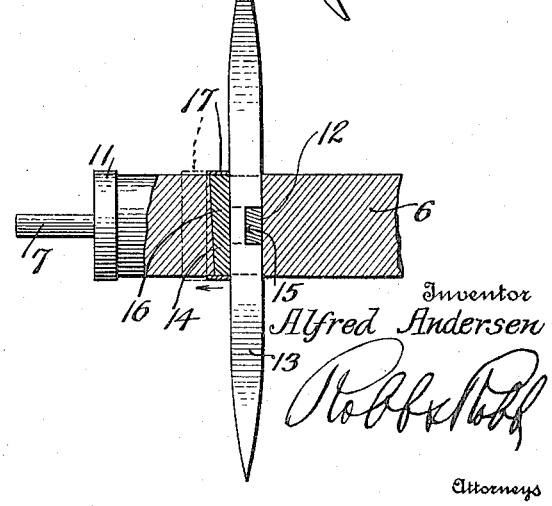

UNITED STATES PATENT OFFICE.

ALFRED ANDERSEN, OF MINNEAPOLIS, MINNESOTA.

HARROW.

1,145,653.  Specification of Letters Patent.  Patented July 6, 1915.

Application filed June 9, 1914. Serial No. 844,054.

*To all whom it may concern:*

Be it known that I, ALFRED ANDERSEN, a citizen of Sweden, residing at Minneapolis, in the county of Hennepin and State of Minnesota, have invented certain new and useful Improvements in Harrows, of which the following is a specification.

This invention relates to improvements in harrows of the rotary picker type, and the object in view is the efficient breaking up of clods and lumps by the utilization of a minimum amount of power.

The further object in view is the effective mounting of the harrow teeth for facilitating ready removal and replacement.

With these and further objects in view the invention comprises a frame, a rotary shaft journaled therein, and detachable harrow teeth fixed to the shaft.

The invention further comprises a rotary shaft, a plurality of teeth carried thereby, and wedges for rigidly securing the teeth in engagement with the shaft.

The invention comprises certain other novel constructions, combinations, and arrangements of parts as will be hereinafter specified and claimed.

In the accompanying drawings: Figure 1 is a view in side elevation of a harrow embodying the features of the present invention, parts being broken away and showing parts in vertical section. Fig. 2 is a rear end view thereof. Fig. 3 is an enlarged detail perspective view of one of the roller shafts detached. Fig. 4 is a fragmentary detail vertical section through one end portion of the rotary shaft and connected parts, parts being seen on a still further enlarged scale. Fig. 5 is an end view thereof. Fig. 6 is a view similar to Fig. 4, the section being taken on the plane at right angles to the plane of the section of Fig. 4. Fig. 7 is a detail view of a tooth bar.

Referring to the drawings by numerals 1 indicates a harrow frame supporting a flooring or platform 2 upon which an operator may ride while driving the draft animals connected to any appropriate hitching device 3 with the frame 1. The frame 1 consists of parallel side beams and connecting cross beams in the former of which are arranged the bearing blocks 5, 5 in which are journaled the roller shafts 6, each shaft having a journal projection 7 at each end extending into and finding a bearing in the blocks 5. The blocks 5 are preferably detachably bolted to the frame 1 for enabling removal thereof and disconnection from the respective shafts 6.

Each shaft 6 consists of a cylindrical body extending from side to side of the harrow frame being formed at one end with a notch 8 extending across the end of the shaft and communicating with diametrically oppositely arranged longitudinal notches 9, 9. A U-shaped bar 10 is arranged in the notches 8 and 9 and is proportioned to fill the notches, the cross member of the bar being formed with an axially extending shaft producing the journal 7. A ring or band 11 surrounds the outer portion of the U-shaped member 10 and clamps the material of shaft 6 and the U-shaped member together. The journal 7 at the opposite end of shaft 6 may be fixed in the same manner but preferably merely consists of a short section of shaft set axially in shaft 6 and fixed thereto.

At a series of places along the length of each shaft 6, the shaft is formed with an aperture 12 of a size adapted to snugly receive a harrow tooth bar 13 and also with an aperture 14 extending through the shaft at right angles to the axis of aperture 12 and dimensioned to likewise receive a bar 13 but in addition being sufficiently large to accommodate the full thickness of the bar when lying across the adjacent bar disposed in recess 12. Each of the bars 13, as clearly seen in Fig. 7 is formed with a cross notch 15 at its middle which terminates at each end in a harrow tooth the main body of the bar being preferably square in cross section.

When it is desired to assemble a pair of the bars 13 in a set of apertures 12, 14, one bar 13 is passed through aperture 12 with the notch 15 facing aperture 14, and then the other bar 13 is passed through aperture 14, the full thickness of the bar being accommodated between the base of the notch 15 of the already inserted bar and the opposite wall of the aperture 14. When the second bar has been introduced fully, its notch 15 facing the first introduced bar comes into registry therewith and then the second introduced bar may be moved laterally in respect to itself, that is, longitudinally of the shaft 6 until the two bars occupy the same transverse planes of shaft 6 and to prevent lateral movement of the second introduced bar, a wedge or other retaining block 16 is introduced in aperture 14 in the rear of the bar 13. The bars are thus firmly locked in place and form projecting harrow teeth.

As a precaution against accidental dislocation of the block 16, a ring or band 17 surrounds shaft 6 at one side of each pair of teeth bars 13 and is adapted to slide from the dotted line position indicated in Fig. 6 to the full line position indicated therein and thus inclose the ends of the block 16 and positively prevent accidental removal thereof. The ring 17 nearest the end bearing the bar 10 also serves to aid in confining the arms of said bar since the bar extends along shaft 6 to the first set of teeth.

Having thus described my invention, what I claim as new is:

1. In a harrow, the combination of a rotary shaft having a transverse aperture adapted to receive a harrow tooth bar, a second similar aperture intersecting the first and sufficiently larger than the first to enable a harrow tooth bar to be introduced into the second aperture past a bar in the first aperture, a harrow tooth bar substantially filling the first aperture and having a notch facing the second mentioned aperture, a second harrow tooth bar extending through the second mentioned aperture and having a notch facing the first-mentioned bar and interlocking therewith, a block disposed between the second-mentioned bar and the opposite wall of the respective aperture, and means for preventing dislocation of the block.

2. In a harrow, the combination of a rotary shaft having a transverse aperture adapted to receive a harrow tooth bar, a second similar aperture intersecting the first and sufficiently larger than the first to enable a harrow tooth bar to be introduced into the second aperture past a bar in the first aperture, a harrow tooth bar substantially filling the first recess and having a notch facing the second mentioned aperture, a second harrow tooth bar extending through the second mentioned aperture and having a notch facing the first mentioned bar and interlocking therewith, a block disposed between the second-mentioned bar and the opposite wall of the respective aperture, and a ring surrounding the shaft and disposed to be moved to and from a position inclosing the block.

3. In a harrow, the combination of a rotary shaft having a set of intersecting apertures, harrow tooth bars extending through said apertures, means for locking the bars therein, said bars being disposed adjacent one end portion of the shaft and the said end portion being formed with diametrically opposite longitudinal grooves extending from the bars to the end of the shaft, and a transverse groove extending across the end of the shaft and communicating with the longitudinal grooves, a U-shaped bar disposed in said grooves and having a journal projecting outwardly from the bar and a ring surrounding the shaft and engaging the locking means for the bars and the arms of the U-shaped bar for retaining the engaged parts in position.

In testimony whereof I affix my signature in presence of two witnesses.

ALFRED ANDERSEN.

Witnesses:
ANTON JENSTAD,
C. L. WILSON.

Copies of this patent may be obtained for five cents each, by addressing the "Commissioner of Patents, Washington, D. C."